United States Patent
Mouquet

(10) Patent No.: US 12,532,201 B2
(45) Date of Patent: Jan. 20, 2026

(54) TRANSMISSION OF DATA FROM A COMMUNICATION NETWORK TO A USER EQUIPMENT

(71) Applicant: ORANGE, Issy-les-Moulineaux (FR)

(72) Inventor: Antoine Mouquet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 331 days.

(21) Appl. No.: 18/546,181

(22) PCT Filed: Feb. 4, 2022

(86) PCT No.: PCT/FR2022/050218
§ 371 (c)(1),
(2) Date: Aug. 11, 2023

(87) PCT Pub. No.: WO2022/171952
PCT Pub. Date: Aug. 18, 2022

(65) Prior Publication Data
US 2024/0121645 A1    Apr. 11, 2024

(30) Foreign Application Priority Data
Feb. 12, 2021    (FR) ...................... 2101333

(51) Int. Cl.
*H04W 24/08* (2009.01)
*H04W 60/04* (2009.01)
(Continued)

(52) U.S. Cl.
CPC ........... *H04W 24/08* (2013.01); *H04W 60/04* (2013.01); *H04W 68/02* (2013.01); *H04W 76/10* (2018.02)

(58) Field of Classification Search
CPC .............................. H04W 68/02; H04L 63/123
See application file for complete search history.

(56) References Cited

U.S. PATENT DOCUMENTS 6,389,420 B1 * 5/2002 Vahalia ............... G06F 16/1774
709/248
7,315,926 B2 * 1/2008 Fridella .................. G06F 9/526
711/151
(Continued)

FOREIGN PATENT DOCUMENTS

CN    109548137 A  *  3/2019  ............ H04W 60/00
CN    116830769 A  *  9/2023  ............ H04W 76/10
(Continued)

OTHER PUBLICATIONS

I. Sato, A. Bouabdallah and X. Lagrange, "Improving LTE/EPC signaling for sporadic data with a control-plane based transmission procedure," 2011 The 14th International Symposium on Wireless Personal Multimedia Communications (WPMC), Brest, France, 2011, pp. 1-5 (Year: 2011).*

(Continued)

*Primary Examiner* — William D Cumming
(74) *Attorney, Agent, or Firm* — David D. Brush; Westman, Champlin & Koehler, P.A.

(57) ABSTRACT

A method for transmitting data from a communication network to an item of user equipment. The method includes: detecting reception of a request to obtain data, sent by the item of user equipment; monitoring whether a session with the item of user equipment through the communication network is established following the detection of the reception of said request; and if no establishment of a session with the item of user equipment is detected before expiration of a period after the detection of the reception of the request, transmitting, to the item of user equipment, at least one signalling message containing the data. Also provided are a network entity, a corresponding system and item of user equipment.

14 Claims, 9 Drawing Sheets

(51) Int. Cl.
*H04W 68/02* (2009.01)
*H04W 76/10* (2018.01)

(56) References Cited

U.S. PATENT DOCUMENTS

| | | | | |
|---|---|---|---|---|
| 8,499,004 | B2* | 7/2013 | Vaghani | G06F 16/1774 707/703 |
| 10,505,741 | B1* | 12/2019 | Conley | H04L 63/123 |
| 2006/0064554 | A1* | 3/2006 | Fridella | G06F 3/0614 711/151 |
| 2010/0235376 | A1* | 9/2010 | Sukanen | G06F 16/68 707/769 |
| 2012/0310909 | A1* | 12/2012 | Vaghani | G06F 16/1774 707/704 |
| 2024/0121645 | A1* | 4/2024 | Mouquet | H04W 68/02 |

FOREIGN PATENT DOCUMENTS

| | | | | |
|---|---|---|---|---|
| CN | 117041964 A | * | 11/2023 | H04W 12/069 |
| CN | 112970324 B | * | 4/2024 | H04W 76/18 |
| CN | 113261383 B | * | 4/2024 | H04W 76/18 |
| CN | 113287341 B | * | 6/2024 | H04W 28/0289 |
| CN | 119729470 A | * | 3/2025 | H04W 4/50 |
| EP | 3216239 B1 | | 1/2018 | |
| EP | 4292380 B1 | * | 12/2024 | H04W 68/02 |
| ES | 3013107 T3 | * | 4/2025 | H04W 68/02 |
| FR | 3119962 A1 | * | 8/2022 | H04W 76/10 |
| WO | WO-2022171952 A1 | * | 8/2022 | H04W 76/10 |
| WO | WO-2025164490 A1 | * | 8/2025 | H04W 24/08 |

OTHER PUBLICATIONS

"3rd Generation Partnership Project; Technical Specification Group Services and System Aspects; System architecture for the 5G System (5GS); Stage 2 (Release 16)," Technical Specification, 3GPP TS 23.501 V16.7.0 (Dec. 2020).

"3rd Generation Partnership Project; Technical Specification Group Services and System Aspects; Procedures for the 5G System (5GS); Stage 2 (Release 16)," Technical Specification, 3GPP TS 23.502 V16.7.1 (Jan. 2021).

"3rd Generation Partnership Project; Technical Specification Group Services and System Aspects; Study on enhanced support of non-public networks (Release 17)," Technical Specification, 3GPP TR 23.700-07 V1.2.0 (Nov. 2020).

"Update Solution 3: Fix up, Impacts and Evaluation," SA WG2 Meeting—Temporary Document, #S2-128BIS, S2-188015, Aug. 20-24, 2018, Sophia Antipolis, France.

International Search Report dated May 31, 2022 for corresponding International Application No. PCT/FR2022/050218, filed Feb. 4, 2022.

Written Opinion of the International Searching Authority dated May 31, 2022 for corresponding International Application No. PCT/FR2022/050218, filed Feb. 4, 2022.

Interdigital Inc, "Update Solution 3: Fix up, Impacts and Evaluation", vol. SA WG2, No. Sophia Antipolis, France;Aug. 20, 2018-Aug. 24, 2018, Aug. 14, 2018 (Aug. 14, 2018), 3GPP Draft; S2-188015_CIOT_Update Solution 3 Fix Up, Impacts and Evaluation, 3rd Generation Partnership Project (3GPP), Mobile Competence Centre ; 650, Route Des Lucioles ; F-06921 Sophia-Antipolis CE, Retrieved from the Internet: URL:http://www.3gpp.org/ftp/tsg%5Fsa/WG2%5FArch/TSGS2%5F128BIS%5FSophia%5FAntipolis/Docs/S2%.

Samsung, "Evaluation and Conclusion of KI1", vol. SA WG2, No. Dongguan, China; Oct. 15, 2018-Oct. 19, 2018, Oct. 8, 2018 (Oct. 8, 2018), 3GPP Draft; S2-1810306 Small Data Solution Conclusion KI1, 3rd Generation Partnership Project (3GPP), Mobile Competence Centre ; 650, Route Des Lucioles ; F-06921 Sophia-Antipolis Cedex ; France, Retrieved from the Internet: URL:http://www.3gpp.org/ftp/tsg%5Fsa/WG2%5FArch/TSGS2%5F129%5FDongguan/Docs/S2%2D1810306%2Ezip.

International Preliminary Report on Patentability and English translation of the Written Opinion of the International Searching Authority dated May 31, 2022 for corresponding International Application No. PCT/FR2022/050218, filed Feb. 4, 2022.

* cited by examiner

TRANSMISSION OF DATA FROM A COMMUNICATION NETWORK TO A USER EQUIPMENT

CROSS-REFERENCE TO RELATED APPLICATIONS

This application is a Section 371 National Stage Application of International Application No. PCT/FR2022/050218, filed Feb. 4, 2022, which is incorporated by reference in its entirety and published as WO 2022/171952 A1 on Aug. 18, 2022, not in English.

FIELD OF THE DISCLOSURE

The present invention relates to the transmission of data from a communication network to a user equipment, and more particularly the transmission to a mobile terminal of authentication data.

BACKGROUND OF THE DISCLOSURE

In the current mobile networks, whether these be "4G" or "5G" networks, several data transmission modes are possible between the terminal of the user and the network core. In particular, a conventional mode of transmission in the user plane, more adapted to high-volume data but more cumbersome to implement, where the terminal exchanges data with a network entity acting as the gateway between the mobile network and the third-party networks such as the internet (P-GW gateway in 4G, UPF node in 5G), and a mode of transmission in the control plane, more adapted to low-volume data and less cumbersome to implement, where the terminal exchanges data with another network entity by means of signaling messages (MME entity in 4G, AMF node in 5G), are differentiated.

Thus, when certain data are to be transmitted from the network to the mobile terminal, it may be envisioned to use one or the other of these two embodiments.

In order for the network to be able to manage the selection between these two download data transmission modes, it has already been provided in the patent EP 3216239 B1 for the network to measure the volume of data being downloaded to a mobile terminal, the mode of transmission in the control plane being favored by the network when these data have a low volume, and vice versa. This mechanism relies on a discrimination based on the volume of data, and means that the low-volume download data are systematically transmitted in the control plane, which is not always an optimum solution as regards management of network resources, notably when the mobile terminal is already connected user plane of the mobile network.

It has also been provided for the mobile terminal to indicate to the network its own preference between these two modes of transmission, in order for the latter to be taken into account by the network for deciding the mode of transmission for the download data to be transmitted to the mobile terminal. This other provision then requires an adaptation in the mobile terminals, which may prove to be difficult to implement.

For its part, a 3GPP contribution "Update Solution 3: Fix up, Impacts and Evaluation" (3GPP Draft; S2-188015, XP051536964, 14 Aug. 2018) mentions in a very general manner, from amongst various possible solutions to the problem of the infrequent transmission of low-volume data, a solution which would be based on the principle of a transmission of data in the control plane without prior establishment of a PDU session, while however underlining the problems that it causes and in the end preferring to it another solution "Data over CP via SMF" based on a PDU session.

Furthermore, the installation of private networks (referred to as NPN, Non-Public Networks), for example reserved for the use of a company on an industrial site, constitutes one of the cases of major uses of 5G technology. In this context, a company user of an NPN wishes to connect to its NPN a device that it has purchased "off the shelf", in other words this device has not been pre-configured during its fabrication with the authentication information (called "credentials") needed for its registration on the NPN.

In order to meet this need, the document 3GPP TR 23.700-07 "Study on enhanced support of Non-Public Networks (NPN)", version 1.2.0 (November 2020), provides for a user equipment to send to an NPN a registration request containing an indication "registration request is for onboarding", for it to be registered in the NPN and for it subsequently to use the connectivity offered by this NPN for receiving from a provisioning server (or PS) the authentication information that it will need to use for subsequently registering with this same NPN.

The document TR 23.700-07 furthermore envisions two modes for receiving this authentication information, in this case a first mode of transmission in the user plane, instigated by the user equipment, where the user equipment requests the establishment of a PDU session then uses the IP connectivity offered by this PDU session for establishing a connection to the PS and a second mode of transmission in the control plane, instigated by the network, which then requires that the network is aware of the mode to be used in order to trigger or not the mode of transmission in the control plane, given that some terminals may only support one of these two modes.

SUMMARY

An exemplary embodiment of the present invention aims to overcome the drawbacks of the implementations provided hereinabove, by providing a method for selecting a mode of transmission which does not have the drawbacks of these implementations.

For this purpose, a method is provided for transmission of data from a communication network to a user equipment, comprising the following steps:
  detect the receipt of a request to obtain data, sent out by said user equipment;
  monitor whether a session with said user equipment over the communication network is established following the detection of the receipt of said request; and
  if no establishment of a session with said user equipment is detected prior to the expiration of a time period after the detection of the receipt of said request, transmit to the user equipment at least one signaling message containing said data.

This method may furthermore comprise, when the establishment of a session with the user equipment is detected prior to the expiration of said time period, the transmission of said data to the user equipment by means of said session.

According to one embodiment in which said data are data usable by the user equipment, available in network equipment implementing said monitoring of the establishment of a session with the user equipment, distinct from a first network entity receiving said request made by the user equipment, the detection of the receipt of said request furthermore comprises the transmission, from the first network entity to the network equipment, of a message notifying the receipt of said request by the first network entity, said monitoring being triggered by the receipt of the notification message by the network equipment.

In one particular embodiment, this session is an application session established between the network equipment and the user equipment.

In another particular embodiment, this session is a data exchange session established by means of a session management entity, said monitoring of the establishment of a session comprising the monitoring, by the network equipment, of the receipt of a message notifying the establishment of a session for exchange of data whose transmission is triggered by said session management entity following the establishment of a data exchange session by means of the session management entity.

According to another embodiment in which said data are available via network equipment distinct from a second network entity implementing said monitoring of the establishment of a session with the user equipment, said transmission to the user equipment of the signaling messages containing said data comprises the transmission, from the second network entity to the network equipment, of a request instructing the network equipment to transmit said data to a third network entity and the transmission, from said third network entity to the user equipment, of at least one signaling message containing said data.

In one particular embodiment, in which the second network entity receives said request, the receipt of said request triggers the monitoring of the establishment of a session with the user equipment.

According to one embodiment in which said session is a session established by means of a session management entity, said monitoring of the establishment of a session comprises the monitoring, by the second network entity, of the receipt of a notification message whose transmission is triggered by said session management entity following the establishment of a session established by means of the session management entity.

According to another embodiment in which said session is a data exchange session established by means of a session management entity, said monitoring of the establishment of a session comprises the monitoring, by the second network entity, of the transmission between the session management entity and the user equipment of a message confirming the establishment of a data exchange session with the user equipment.

In one particular embodiment in which said session is an application session established between the network equipment and the user equipment, the network equipment transmits to the second network entity a message notifying establishment of a data exchange session following the establishment of said application session.

In one particular embodiment, said aforementioned network equipment is an authentication data provisioning server and said data are authentication data.

A network entity is also provided that is able to be used in a communication network, said network entity being configured to monitor whether a session with a user equipment is established over the communication network following the detection of the receipt of a request to obtain data, sent out by said user equipment, and if no establishment of a session with said user equipment is detected before the expiration of a time period after said detection of the receipt of said request, triggering the transmission to the user equipment of at least one signaling message containing said data.

A system is also provided comprising the aforementioned network entity together with another network entity able to be used in a communication network, this other network entity being configured to detect the receipt of a request to obtain data, sent out by said user equipment, and, following the detection of the receipt of said request, triggering the monitoring for a given duration of the establishment of a session with said user equipment over the communication network.

A user equipment is also provided able to be used with a communication network, said user equipment being configured to transmit, to a network entity of the communication network, a request to obtain data and to receive, in return, from a network entity of the communication network, at least one signaling message containing said data, transmitted following the expiration of a time period after the receipt of said request without a session having been established over the network with said user equipment.

This user equipment may advantageously furthermore comprise a timer module, configured so as to be triggered by the transmission of the request to obtain data and blocking the sending out of a request for establishment of a session to the network until the expiration of a given period of time after the triggering of the timer module.

This user equipment may advantageously be furthermore configured to insert an identifier of said user equipment into a connection request intended for network equipment in which said data are available and for transmitting said connection request to said network equipment, in order to trigger the acquisition of said data by the network equipment by means of said identifier and the receipt of said data via a connection with the network equipment.

BRIEF DESCRIPTION OF THE DRAWINGS

Other features and advantages of the invention will become more clearly apparent upon reading the following description of particular embodiments, given by way of simple illustrative and non-limiting examples, and from the appended drawings, amongst which.

DETAILED DESCRIPTION OF ILLUSTRATIVE EMBODIMENTS

Figure 1:
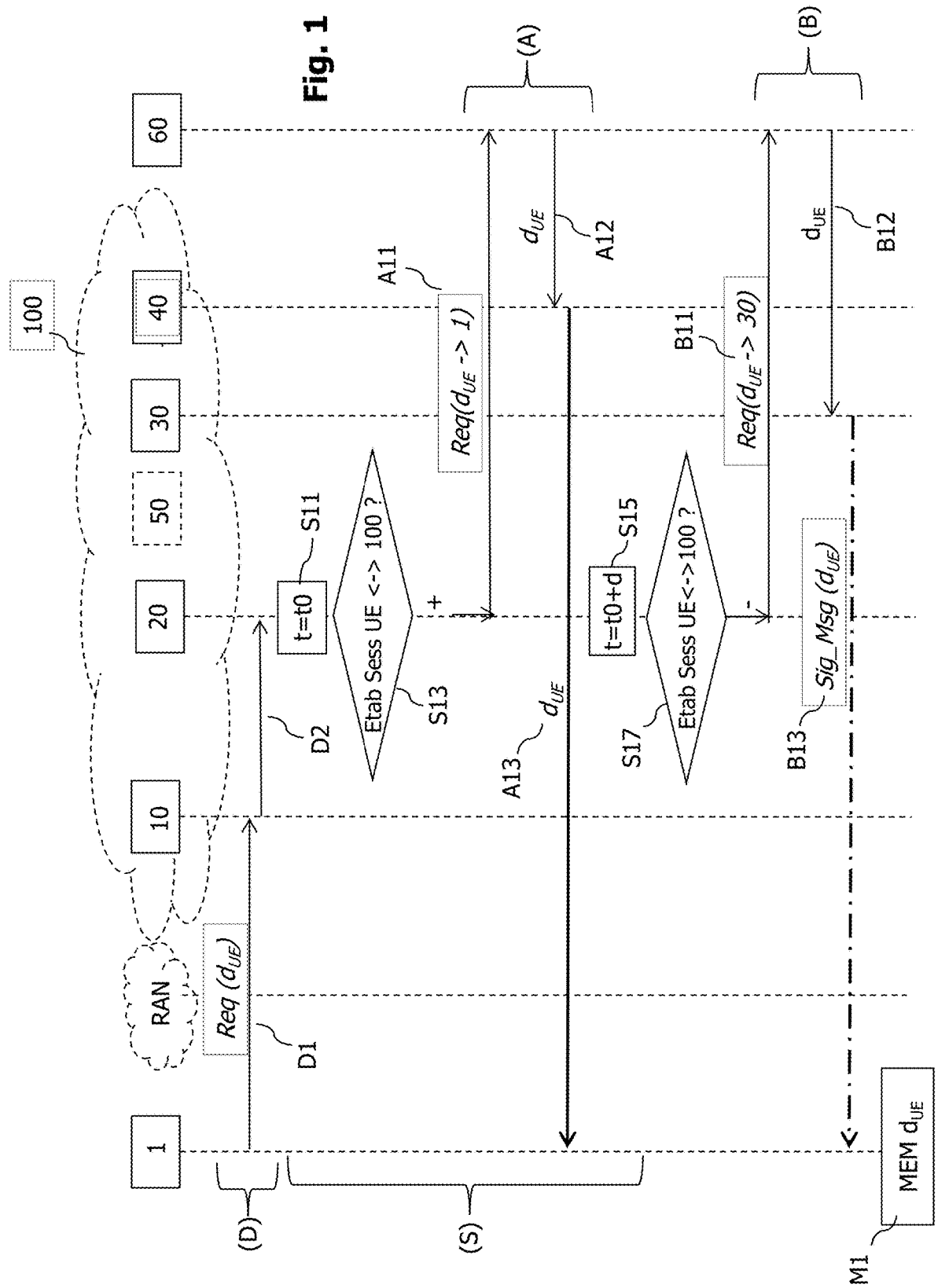
FIG. 1 shows the steps of a method according to the general principle of the present invention.

Reference is first of all made to FIG. 1, in which the steps of the method according to the general principle of the present invention are illustrated.

This method is employed in the framework of the transmission of data, over a communication network 100, from network equipment 60 to a user equipment 1 (for example a smartphone, a tablet, a mobile telephone, a laptop, a communicating object, etc.).

This network equipment 60 is typically third-party network equipment, situated in a network external to the communication network 100 and connected to the latter via a network node 40 acting as an access gateway to external networks, but may also be network equipment belonging to the core part of this network, when the network is a mobile communication network. It may in particular be a server, which may be denoted as a "provisioning server", storing certain data to be supplied to user equipment, and more particularly an authentication data provisioning server.

The data being considered here may more particularly be data usable by the user equipment UE (in the sense that, once it has been received by this user equipment, it may be stored for a later use by this user equipment) and available in this network equipment 60, either because they are stored in it, or because this network equipment 60 generates them in advance or as required, or because this network equipment 60 can receive them from other network equipment. These data may in particular be authentication data, allowing the user equipment to authenticate itself so as to be able to access a network, referred to as "credentials" which may be generated and/or stored by an authentication data provisioning server.

This method first of all comprises the detection (phase D in FIG. 1) of the receipt (step D1) of a request (Req ($d_{UE}$) in FIG. 1), made by the user equipment 1, for obtaining data ($d_{UE}$ in FIG. 1).

This detection may be implemented by a network entity 10 (which may also be referred to as network node) of the communication network 100. This network entity 10, here responsible for detecting the receipt of the request to obtain data $d_{UE}$ sent out by the equipment 1, may be an entity of the network 100 distinct from the aforementioned network equipment 60 or may be the same thing as the latter, depending on the embodiments. This detection D may be direct, when this network entity 10 itself receives this request, or indirect, when another network entity receives this request and notifies the network entity 10 of this.

As will be illustrated hereinbelow, this request may in particular be a request to register with the network ("REGISTER REQUEST") such as defined in the specification 3GPP TS 23.502 (v16.7.1) relating to the 5G standard, in which an indication is inserted that the equipment UE wishes to obtain these data.

It is subsequently monitored (phase S in FIG. 1) whether a session with said user equipment is established over the communication network following the detection of the receipt of said request. This monitoring step may be implemented by a network entity 20 which may be distinct from the aforementioned network entity 10 and from the aforementioned network equipment 60, or may be the same thing as one of the latter, depending on the embodiments. When the network entity 20 is distinct from the network entity 10, this monitoring may notably be triggered by the receipt of a notification message sent out (step D2) by the network entity 10 after it has received the request from the equipment 1 to obtain data.

The establishment of a session with the equipment 1 may be directly detected by the network entity 20, as illustrated in FIG. 1. This is in particular the case when this network entity 20 is the same thing as the network equipment 60 and when a session is established between the equipment 1 and the network equipment 60, for example an application session. This is also the case when the session is a data exchange session established by means of a session management entity 50, as may be the case for a PDU Session, and when the network entity 20 intercepts a message from the session management entity confirming the establishment of such a session with the equipment 1.

The establishment of a session with the equipment UE may also be indirectly detected by the network entity 20, by means of a notification received from a network entity involved in the establishment of this session. This is in particular the case when this network entity 20 is distinct from the network equipment 60, when a session (for example an application session) is established between the equipment UE and the network equipment 60 and when the network equipment 60 notifies the network entity of the establishment of this session. This is also the case when the session is a data exchange session established by means of a session management entity distinct from the network entity 20, as may be the case for a PDU session, this session management entity then notifying the network entity 20 when such a session is established.

This monitoring phase S is a temporary monitoring phase, following which a decision to transmit the data $d_{UE}$ in the control plane is taken if no decision to transmit these same data in the user plane has been taken beforehand during this monitoring phase.

For this purpose, as illustrated here in FIG. 1, this monitoring phase may be initiated by the triggering (step S11) of a timer upon the detection of the receipt of the request sent out by the user equipment (i.e. at the time t0 in FIG. 1), this timer expiring after a certain time period d (step S15), which may be predetermined or (re)configurable by the operator of the communication network. This time period d may be of the order of a few seconds, for example 5 or 10 seconds.

It may be advantageous to associate this timer with an identifier of the user equipment (for example its SUPI identifier or its hardware PEI identifier) having made the request, typically by extracting this identifier from the request itself, which allows a list of various timers to be maintained (potentially triggered at various times) associated with various identifiers of user equipment, and thus to distinguish and manage independently various pieces of user equipment that would require data at the same time.

Two different scenarios may thus arise.

In a first case where the establishment of a session with the equipment UE is detected before the expiration of the time period d, it is then deduced that a first mode of transmission (A in the FIG. 1), in the user plane, is to be used to supply the data $d_{UE}$ to the equipment UE, by means of the session established with this equipment 1 (step S13).

In this first case, the data $d_{UE}$ are then transmitted to this user equipment 1 by means of the session whose establishment has been detected. When the network entity 20 is not the same thing as the network equipment 60, the network entity 20 sends an instruction to the network equipment 60 (step A11) for triggering this transmission (steps A12, A13). When the network equipment 60 is accessible via a network external to the network 100, this transmission is carried out via the network entity 40 of the network 1 (which may also be denoted by the term "gateway") allowing the interconnection of the network 1 with other third-party networks as regards the user plane. Once the data $d_{UE}$ has been received by the user equipment 1, the latter can store it (step M1) so as to be used later on.

In a second case where no establishment of a session with the user has been detected prior to the expiration of the time period d (e.g. when a timer expires without a session having been established, cf. step S15 in FIG. 1), it is deduced that a second mode of transmission (B in FIG. 1), in the control plane, is to be used for supplying the data to the equipment 1 (step S17).

In this second case, these data $d_{UE}$ are inserted into signaling messages transmitted to the equipment 1 by a network entity 30, these data $d_{UE}$ thus being transmitted in the control plane rather than in the user plane of the network.

This network entity 30, here responsible for transmitting to the equipment 1 the signaling messages into which the data usable by the equipment 1 have been inserted, may be distinct from the aforementioned network entities 10, 20, 40 and from the aforementioned network equipment 60, or may be the same thing as one of the latter (in particular as the network entity 10), depending on the embodiments.

When the network entity 30 is not the same thing as the network equipment 60, the network entity 20 (responsible for monitoring the establishment of a session) sends a request message to the network equipment 60 (step B11) instructing it to supply these data to the network entity 30 (step B12), the network entity 30 then being able to insert the latter into signaling messages (Msg ($d_{UE}$)) that it transmits to the equipment UE (step B13), which can store it after receipt (step M1) for later use.

The selection of the transmission mode is thus made by the network on the basis of the speed with which a session is established with the user equipment UE after the latter has sent a request to obtain data to the network, and in this way controlled by the network (hence by the operator of the latter) throughout the time period d.

Figure 2:
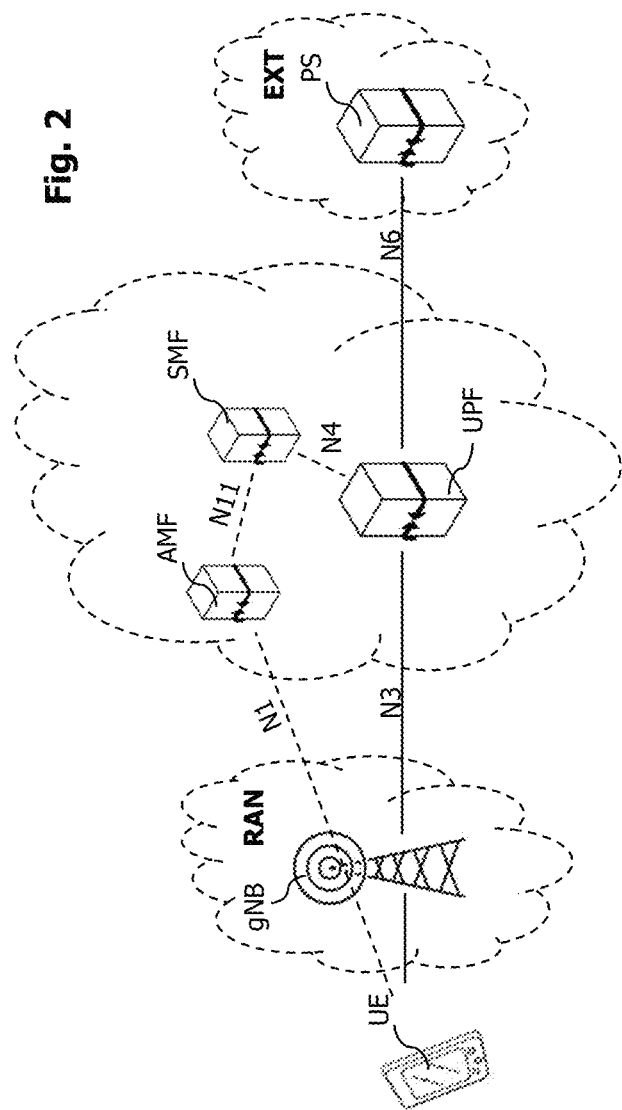
FIG. 2 illustrates a network architecture in which a first embodiment of the present invention may be implemented.

Reference is now made to FIG. 2, which illustrates the architecture of a network such as defined in the 3GPP specifications as regards the 5G standard, in which the steps of this method according to various embodiments of the present invention may be implemented.

In particular, in such a network, beyond a RAN access network which may comprise a certain number of base stations (called "gNB" with regard to 5G), the core 5GC of this network comprises the following entities:

One or more AMF (for "Access and Mobility Management Function") entities, belonging to the control plane of this network, able to receive requests from the equipment UE and able to transmit signaling messages to this equipment UE.

One or more SMF (for "Session Management Function") entities, belonging to the control plane of this network and responsible for the management of the sessions established with the user equipment, in particular sessions called "PDU Session" in the user plane of the network.

One or more UPF (for "User Plane Function") entities, belonging to the user plane of this network and responsible for transmitting the data, in the user plane, between the equipment UE and other equipment accessible via other networks.

One or more NEF (not illustrated, for "Network Exposure Function") entities which allows capacities of the network to be exposed to internal or external applications of the network, by means of APIs referred to as "northbound".

One or more UDM (not illustrated, for "Unified Data Management") entities, which is a unified data management entity and notably allows the PDU Sessions underway, managed by several entities SMF of the same network, to be indexed.

Thus, in such a 5G architecture, the user plane is defined by the interfaces N3 and N6, whereas the control plane is defined amongst other things by the interfaces N1, N4 and N11.

Various illustrative embodiments of the invention will now be described, in the framework of the 5G standard, according to whichever network entity illustrated in FIG. 1 is implemented by whichever network entity of a 5G network such as illustrated in FIG. 2.

Figure 3:
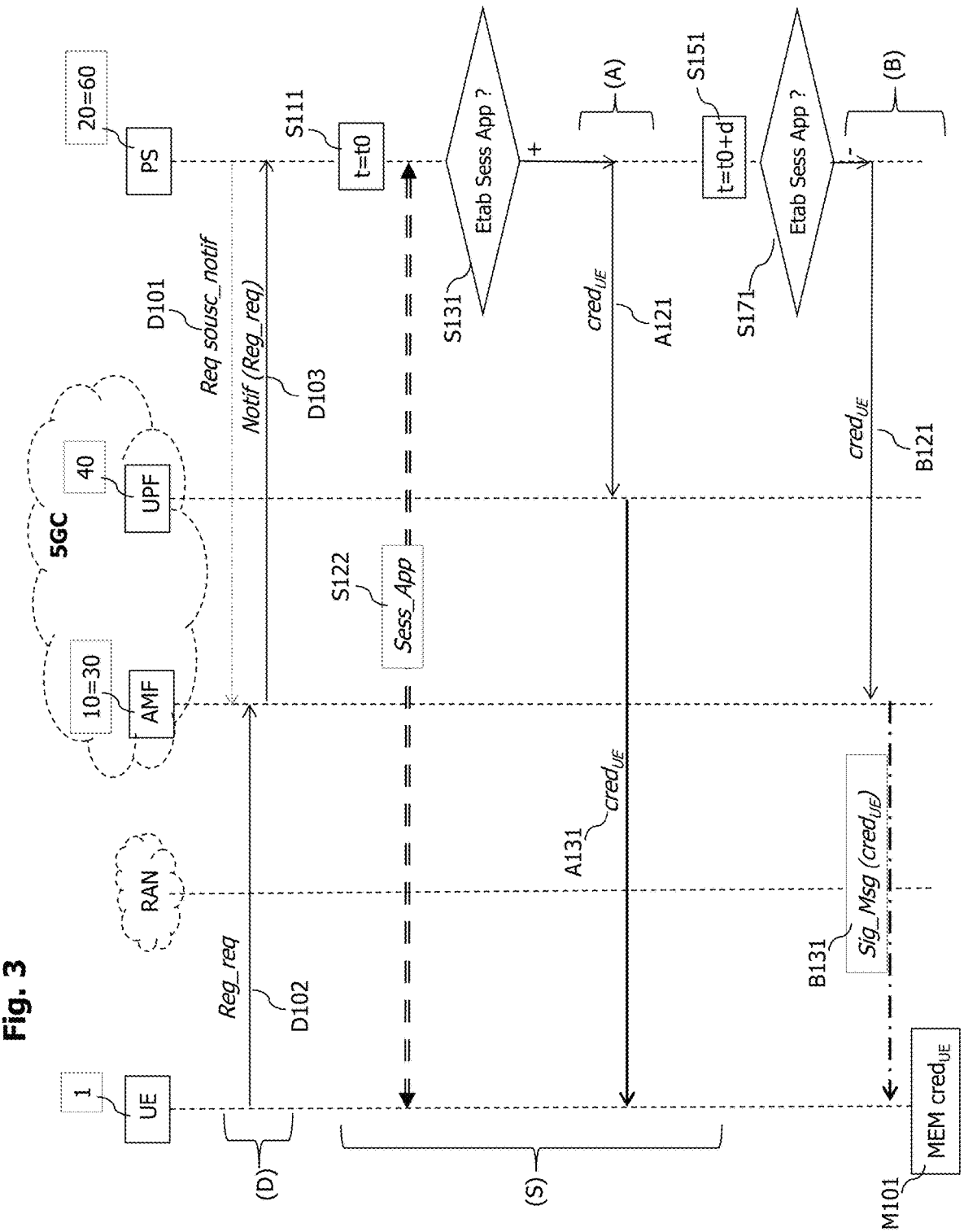
FIG. 3 shows the steps of a method according to a first embodiment of the present invention.

Reference is now made to FIG. 3, which illustrates a first embodiment of the method according to the present invention.

In this first embodiment, the network entities 10 and 30 are implemented by the same AMF entity of a 5G core network, the network entity 40 is implemented by an entity UPF of this same 5G core network, whereas the network entity 20 and the network equipment 60 are implemented by a provisioning server PS, external to this network but accessible via the UPF entity by means of the IP protocol, in which authentication data $cred_{UE}$ usable by the user equipment UE are generated and/or stored so as to be able to authenticate it with certain networks in order to access them.

In a first step, the user equipment UE transmits (step D102) to the AMF node, which receives it, a request aimed at obtaining the authentication data $cred_{UE}$, here in the form of a request to register with the network, "REGISTER REQUEST", such as defined in the specification TS 23.501, containing an indication of the desire of the equipment UE to obtain these data (step S101).

Such a request may in particular be a specific registration request, such as a request REGISTER containing an indication that this registration is a "Register request for Onboarding". Such a request may also comprise an identifier of the equipment UE, for example its SUPI identifier or its hardware PEI identifier.

When it receives this request and observes in it that the equipment UE wishes to be supplied with authentication data, the AMF entity transmits to the provisioning server PS, potentially via an entity NEF, a message notifying receipt of such a request (step D103), this notification message advantageously containing the identifier $SUPI_{UE}$ of the equipment UE in order to allow the server PS to identify the equipment UE requiring authentication data.

The AMF node may be configured so as to spontaneously send out this notification message to the server PS, after receipt of the request and detecting within the latter the desire to obtain the authentication data.

However, in one particular embodiment, the server PS may initially transmit (step D101) to the AMF node, potentially via an entity NEF, a subscription request for notification of an event corresponding to the receipt of such a request, in order to trigger the sending of such a notification message when this event effectively takes place. Such a subscription request may be implemented in a similar manner to the subscription request illustrated in the document 3GPP TS TR 23.700-07 (v.1.2.0), clause 6.30.3.2, step 0b, subscribing with the AMF to the notification of an event of the "register for onboarding" type, which then allows the AMF entity to notify the server PS as soon as it receives a registration request containing an indication according to which this registration is for onboarding.

As soon as it receives this notification sent out by the AMF, the server PS triggers a phase S for monitoring the establishment of a session with this equipment UE, which may be implemented by the triggering (step S111) at a time t0 of a timer with an expiration time d, advantageously able to be specifically associated with the identifier of the equipment UE received in the notification sent out by the AMF node.

In this monitoring phase S, the server PS monitors the application sessions which it establishes with user equipment, and notably the identifiers of the user equipment supplied during the procedure for establishing these application sessions, in order to detect whether one of these identifiers corresponds to an identifier already received in a notification of detection of receipt of request such as described and associated with a timer which has not yet expired.

In a first case where an application session is effectively established (step S122) between the server PS and an equipment UE having sent a request the receipt of which has been detected by the AMF entity before the expiration of a time period d starting with the receipt by the server PS of the notification transmitted by the AMF node for alerting it of the receipt of this request relating to the same equipment UE, the server PS deduces from this that a mode of transmission in the user plane (by means of the UPF entity), using this application session thus established, is to be used (step S131). The authentication data $cred_{UE}$ are then obtained by the server PS (potentially by means of the identifier $SUPI_{UE}$) then transmitted to the equipment UE through the UPF entity (steps A121 and A131). Once received by the equipment UE, the latter stores these authentication data $cred_{UE}$ (step M101). Thus, subsequently, when the equipment UE will try to access equipment or a network requiring an authentication before access, it will be able to transmit these data $cred_{UE}$ in order to obtain the access authorization.

In a second case, where the monitoring phase S terminates with the expiration of the time period d (step S151) without any establishment of application session having been detected between the server PS and an equipment UE (in particular when no establishment of an application session has been detected before the expiration of a timer associated with the identifier of this equipment UE), the server PS deduces from this that a mode of transmission in the control plane is to be used (step S171).

In this case, the server PS transmits the authentication data $cred_{UE}$ to the AMF node (step B121), potentially by means of a UDM entity (and also via a NEF entity notably when the server PS is external to the network 100), the AMF node inserting these authentication data $cred_{UE}$ into one or more signaling message(s) before transmitting it/them (step B131) to the equipment UE. These may in particular be signaling messages according to the procedure for updating user equipment parameters ("UE Parameters Update") such as described in the clause 4.20 of the specification 3GPP TS 23.502 (v16.7.1).

Once this/these signaling message(s) have been received, the equipment UE can proceed with the extraction of these authentication data $cred_{UE}$ in order to store them (step M101) for later use.

This first embodiment is advantageous in that it is mainly implemented in the provisioning server, and hence requires very little modification of the 5G core network entities, notably in its implementation using a subscription to an event with the AMF, which may reuse an already-existing protocol.

Figure 4:
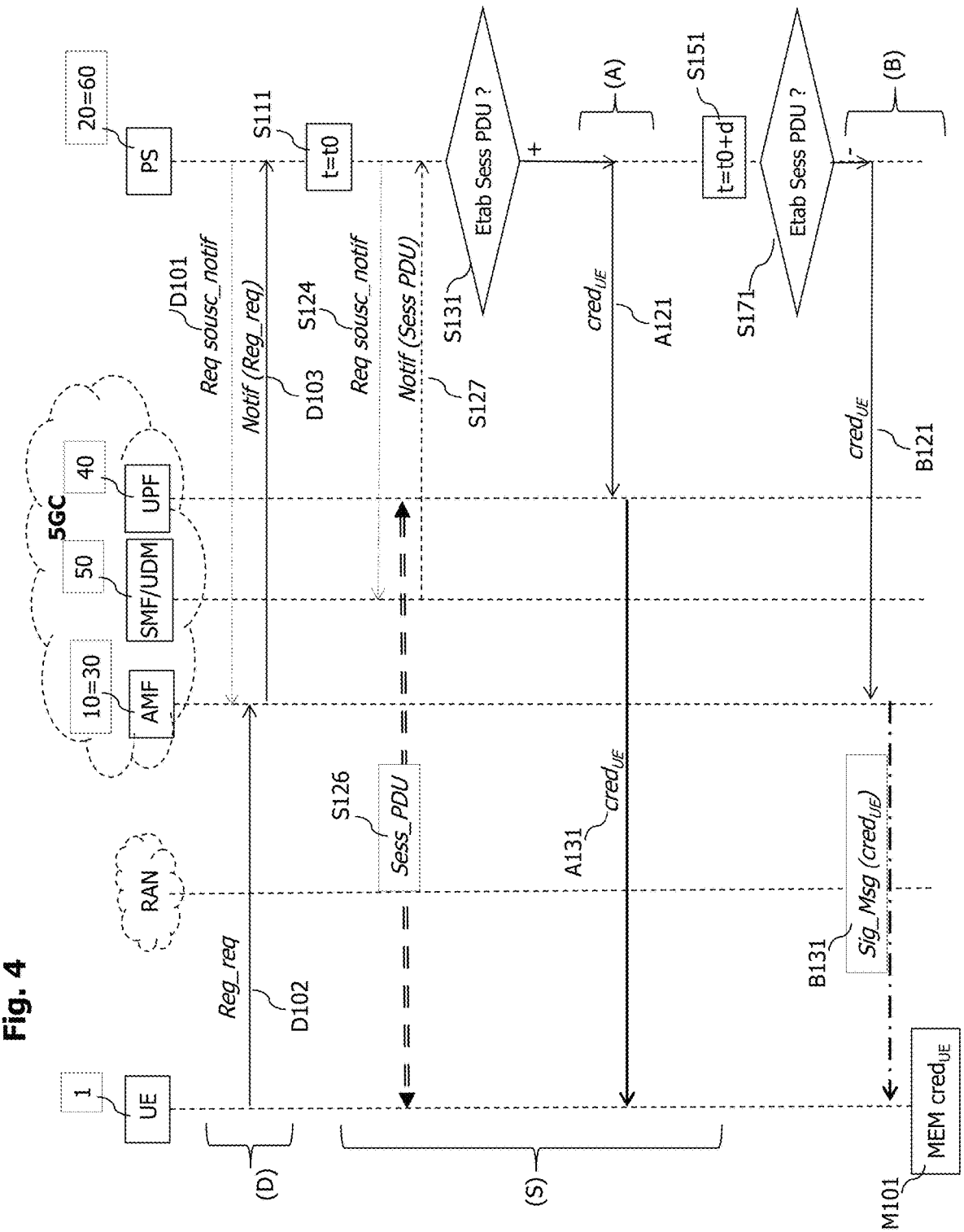
FIG. 4 shows the steps of a method according to a second embodiment of the present invention.

Reference is now made to FIG. 4, which illustrates a second embodiment of the method according to the present invention.

In this second embodiment, the network entities 10-40 and the network equipment 60 are implemented in a similar manner to the aforementioned first embodiment. This second embodiment differs however in that it furthermore involves a session management entity 50, here implemented by an SMF entity of the 5G core network, and the detection of the establishment of a PDU session by means of this SMF entity.

In this second embodiment, the first steps D101 to D103 and S111 are identical to those of the first embodiment.

However, here, the server PS monitors whether a PDU session is established with the equipment UE by means of the SMF entity, under a certain time period d after the receipt by the AMF node of the request sent out by the equipment UE.

The establishment of such a PDU session is not detected directly by the server PS, but indirectly upon notification of this establishment by the SMF node which is involved in the establishment of this session. In other words, when a PDU session is established between the network and the equipment UE (step S126), the SMF node having managed the establishment of this session may trigger the transmission to the server PS of a notification message alerting it of the establishment of a PDU session with the equipment UE (step S127), this notification advantageously including an identifier of this equipment UE (such as its SUPI identifier or its hardware PEI identifier), in order for the server PS to associate this session establishment with a timer triggered in association with the same identifier. This notification may advantageously also contain the IP address allocated to the equipment UE, which may then be used by the server PS to establish a connection with the equipment UE via the PDU session.

The SMF node may spontaneously send out this notification message directly to the server PS, or instruct a UDM entity to do it, after establishment of a PDU session with the equipment UE. When there exist several servers PS, the SMF node may store a table of correspondence storing an identifier of the equipment UE (typically a SUPI or PEI) and the server PS to be used for this equipment, which allows the SMF node to locate the server PS to be notified by means of this identifier of the equipment UE.

In one particular embodiment, the SMF entity only sends such a notification message for user equipments UE which have previously transmitted a specific request for obtaining the data $d_{UE}$ (step D101), in particular a request to register for onboarding such as previously described. For this purpose, after having received such a request, the AMF entity may transmit to a UDM entity an information message with regard to the fact that the equipment UE is registered for onboarding, the SMF entity then obtaining this information from the UDM entity during the establishment of a PDU session with this same equipment UE. Alternatively, the AMF entity may store this information in the context that it conserves of the equipment UE, and transmit it directly to the SMF entity during the establishment of the PDU session.

In another embodiment, the server PS may initially transmit, to the SMF node (when there is only one SMF node in the network 100) or to a UDM node (when there are one or more SMF nodes in the network 100) a subscription request for notification of an event corresponding to the establishment of such a PDU session (step S124), in order to trigger the sending of such a notification message when this event effectively takes place. This subscription request may in particular be advantageously sent after the server PS has received the notification from the AMF entity (and hence triggered the monitoring phase) and contain the identifier of the equipment UE received in this notification from the AMF, in order to subscribe with the SMF (or with the UDM) to an event for establishment of a PDU session specifically associated with an equipment UE having requested the supply of the authentication data which are useful to it. In the case of a subscription to the UDM entity, when one of the SMF nodes of the network participates in the establishment of a PDU session with an equipment UE, this SMF node then sends to the UDM node a message (according to the service Nudm_UECM_Registration for example) in order to inform it of the establishment of this PDU session with an equipment UE, the UDM node then being able to transmit the notification message to the server PS as previously indicated. The sending of this message may be carried out only for the equipment UE registered, by the AMF, as having sent out a request specially to obtain data (e.g. "Onboarding Request"), as previously described.

In a first case where a PDU session is effectively established with the equipment UE having sent a request received by the AMF (step S126), and where this event is notified by the SMF node (or the UDM node) to the server PS by means of a notification message advantageously containing the IP address allocated to the equipment UE, prior to the expiration of a time period d starting with the receipt by this same server PS of the notification transmitted by the AMF node to alert it of the receipt of this request, the server PS then deduces from this that a mode of transmission in the user plane, using this PDU session thus established, is to be used (step S131). In this case, the server PS may establish a connection with the equipment UE by means of the IP address allocated to this equipment, via the PDU session managed by the SMF node and obtain the authentication data $cred_{UE}$ (potentially by means of the identifier $SUPI_{UE}$ when it is transmitted). These data are then transmitted to the equipment UE through the UPF entity (steps A121 and 131), which may store them for later use (step M101), in a similar manner to what is described for the first embodiment.

In a second case where no establishment of a PDU session is notified by the SMF entity to the server PS before the expiration of this same time period d (step S151), the server PS deduces from this that a mode of transmission in the control plane is to be used (step S171). The server PS then transmits the authentication data $cred_{UE}$ to the AMF node (step B121), potentially by means of a NEF entity (notably when the server PS is external to the network 100) and/or a UDM entity as previously indicated, the AMF node inserting these data into signaling messages before transmitting them to the equipment UE (step B131), which can extract them after receipt and store them (step M101) for later use in a manner similar to what is described for the first embodiment.

This second embodiment is advantageous in that the equipment UE does not need to indicate its SUPI or PEI identifier to the server PS which simplifies the implementation when the communication with the server PS and the registration in the network are carried out by separate components.

Figure 5:
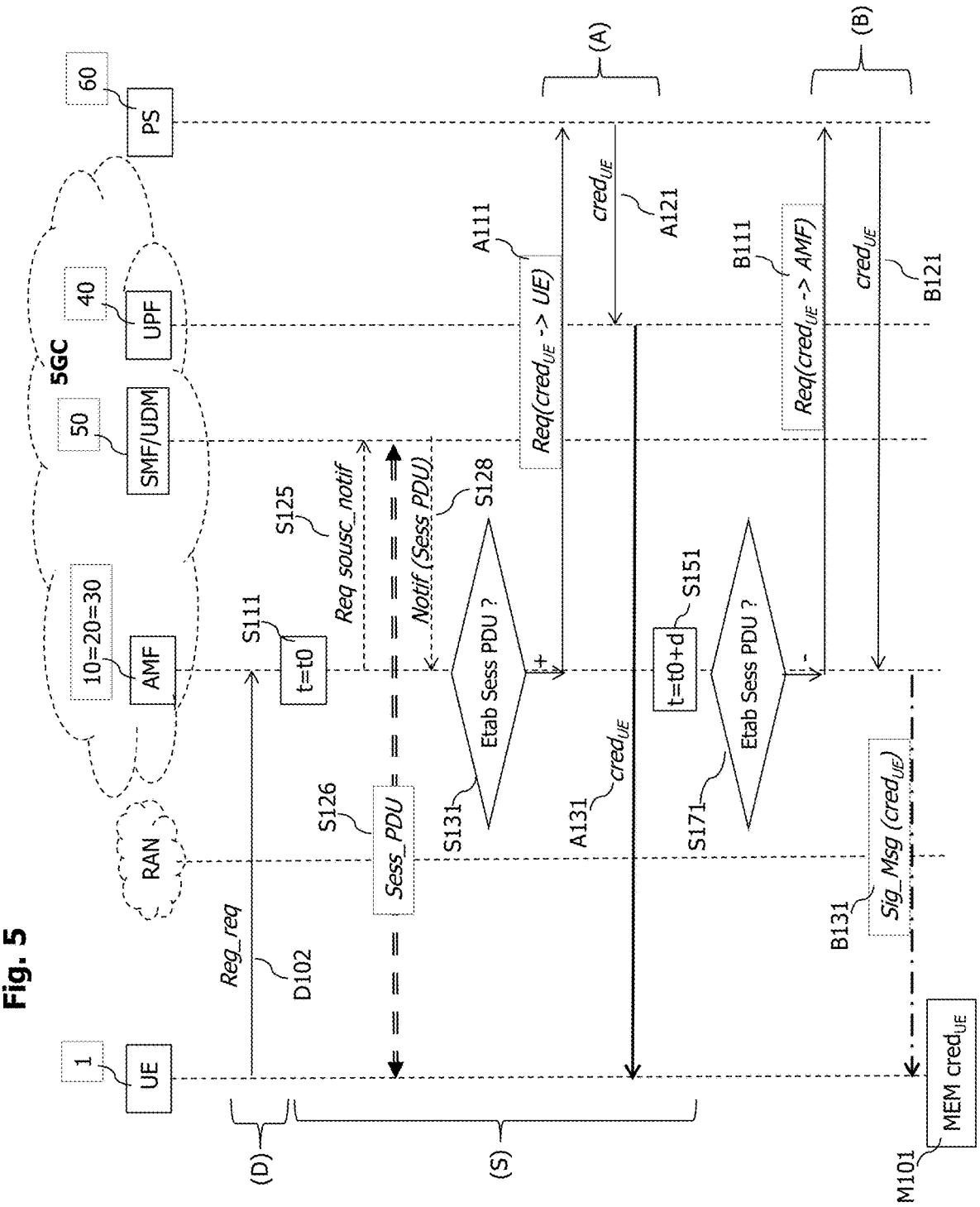
FIG. 5 shows the steps of a method according to a third embodiment of the present invention.

Reference is now made to FIG. 5, which illustrates a third embodiment of the method according to the present invention.

In this third embodiment, the network entities 10, 20 and 30 are implemented by an AMF entity of a 5G core network, the network entity 40 and the network equipment 60 still being implemented, respectively, by a UPF entity and an external provisioning server PS, in a similar manner to the first two embodiments.

This third embodiment thus differs in that it is the AMF node which is responsible for monitoring whether a session is established with the equipment UE before the expiration of a time period d after the receipt of a request from the equipment UE to obtain data usable by this equipment UE.

It also differs in that a session management entity, implemented by a SMF entity of this same 5G core network, is directly involved in the process.

In this third embodiment, the AMF entity first of all receives a request made by the equipment UE similar to that already described in the first embodiment (step D102).

At this stage, the AMF entity begins to monitor, for a certain time period d, whether a PDU session is established with the equipment UE by means of the SMF entity, typically triggering a timer which expires once this time period d has passed (step S111).

In this third embodiment, this monitoring by the AMF entity may be indirect, when it is based on the receipt of a notification coming from the SMF entity alerting it of the establishment of a PDU session with the PDU equipment. In order to be able to identify the equipment UE on which the monitoring is to be carried out, after having received the request from the equipment UE, the AMF entity may transmit (step S125) to the SMF node a request including an identifier $SUPI_{UE}$ of this equipment UE (for example its SUPI identifier or its hardware PEI identifier), this request inviting the SMF node to transmit (step S128) to the AMF entity a notification message when a PDU session is established, by means of this SMF node, with a user equipment identified by this same identifier $SUPI_{UE}$. This notification message may notably contain the IP address of the equipment UE, which could be communicated later on to the server PS in order to establish a connection with the equipment UE so as to supply it with data in the user plane.

Alternatively, when there are several SMF entities within the network 100 and when the SMF entity has not yet been selected at the time of the registration, the AMF entity can send this subscription request to the UDM entity, which is then responsible for informing the AMF when a PDU session is established with this same user equipment UE, following the receipt by the UDM entity of a message notifying establishment of a PDU session coming from the SMF node having participated in this establishment. This request may be a subscription request using a protocol for subscription to event notifications from the SMF entity (and/or from the UDM entity when there are several SMFs) to the AMF entity, and in particular take the form of a message "Nsmf_EventExposure_Subscribe" for the SMF or "Nudm_EventExposure_Subscribe" for the UDM such as defined in the 3GPP specifications.

Alternatively, this monitoring by the AMF may be direct: rather than waiting to receive a notification from the SMF entity alerting it of a potential establishment of a PDU session, the AMF entity may also monitor the messages exchanged between the equipment UE and the SMF entity, so as to detect a potential message confirming the establishment of a PDU session for a certain time period d after the receipt of the request for registration of the equipment UE (typically triggering a timer which expires once this time period d has passed). The AMF entity may here advantageously identify the equipment UE that it is monitoring by detecting a user equipment identifier extracted from the potential confirmation message that it would intercept before the expiration of the time period d, the AMF entity then being able to compare this extracted identifier with the identifier $SUPI_{UE}$ advantageously associated with the timer triggered after the receipt of the registration request from which this identifier $SUPI_{UE}$ is extracted.

In a first case where a PDU session is effectively established with the equipment UE having previously sent to the AMF entity a registration request in order to obtain usable data, and where this event is either notified by the SMF node (or by a UDM node, as explained for the second embodiment) to the AMF node, or directly detected by the AMF before the expiration of a time period d after the receipt by this same AMF node of this registration request, the AMF node then deduces from this that a mode of transmission in the user plane, using this PDU session thus established, is to be used (step S131).

In this case, since a PDU session is established with the equipment UE, the equipment UE can connect to the server PS by means of the IP address of the server PS (either because it knows the address, or because it has received it during its registration). Once the equipment UE is connected to the server PS, the server PS can then obtain the authentication data $cred_{UE}$ associated with this equipment UE, then transmit them to the equipment UE through the UPF entity, by means of the connection established via the PDU session managed by the SMF node (steps A121 and A131). The equipment UE may then store these data for later use (step M101), in a similar manner to what is described for the first embodiment.

In one alternative embodiment, when a PDU session is established with the equipment UE, the equipment UE may wait to receive a connection from the server PS, by means of the IP address of the equipment UE, transmitted by the SMF or the UDM to the AMF in the notification of establishment of a PDU session (step S128). The AMF entity then transmits (step A111) to the server PS (potentially via the NEF entity) an instruction request for transmission of the authentication data $cred_{UE}$, advantageously including the IP address allocated to the equipment UE, where required together with its identifier $SUPI_{UE}$. Upon receipt of such a request, the server PS may then connect to the equipment UE by means of the IP address of the latter, via the PDU session managed by the SMF node, and obtain the authentication data $cred_{UE}$ associated with this equipment UE (for example by means of its identifier $SUPI_{UE}$ or of any other information that it may have obtained from the equipment UE). These data are then transmitted to the equipment UE via this connection, through the UPF entity (steps A121 and A131). The equipment UE may then store them for later use (step M101), in a manner similar to what is described for the first embodiment.

In a second case where no establishment of PDU session is either notified by a SMF or UDM entity to the AMF entity, or detected directly by the AMF itself before the expiration of this same time period d, the AMF entity deduces from this that a mode of transmission in the control plane is to be used.

The AMF entity then transmits (step B111) to the server PS, potentially via a NEF entity, a request to obtain authentication data $cred_{UE}$, potentially including the identifier $SUPI_{UE}$ of the equipment UE. Upon receipt of such a request, the server PS may then obtain the authentication data $cred_{UE}$ potentially associated with this equipment UE, then transmit them in a message to the AMF entity (step B121), potentially via a NEF entity (notably when the server PS is external to the network) together with a UDM entity as previously indicated (in which case the message from the UDM to the AMF may be a message of the type "Nudm_SDM_Notification" such as defined in the 3GPP standard on 5G). The AMF entity then inserts these authentication data $cred_{UE}$ into one or more signaling messages before transmitting it/them to the equipment UE (step B131), which may extract them after receipt and store them (step M101) for later use, in a manner similar to what is described for the first embodiment.

This third embodiment is advantageous in that the management of the selection of the mode of transmission is entrusted to a single entity of the 5G core network, namely the AMF. This allows the exchanges of signaling messages within the network to be minimized, and hence the volume of messages exchanged within the network to be controlled, which may prove to be significant when a very large number of user equipments are trying to obtain authentication data. This also allows the invention to be readily applied to third-party provisioning servers not having either the resources for implementing the monitoring of the sessions in the communication network, or the requirement to take into account the restrictions of this communication network.

Figure 6:
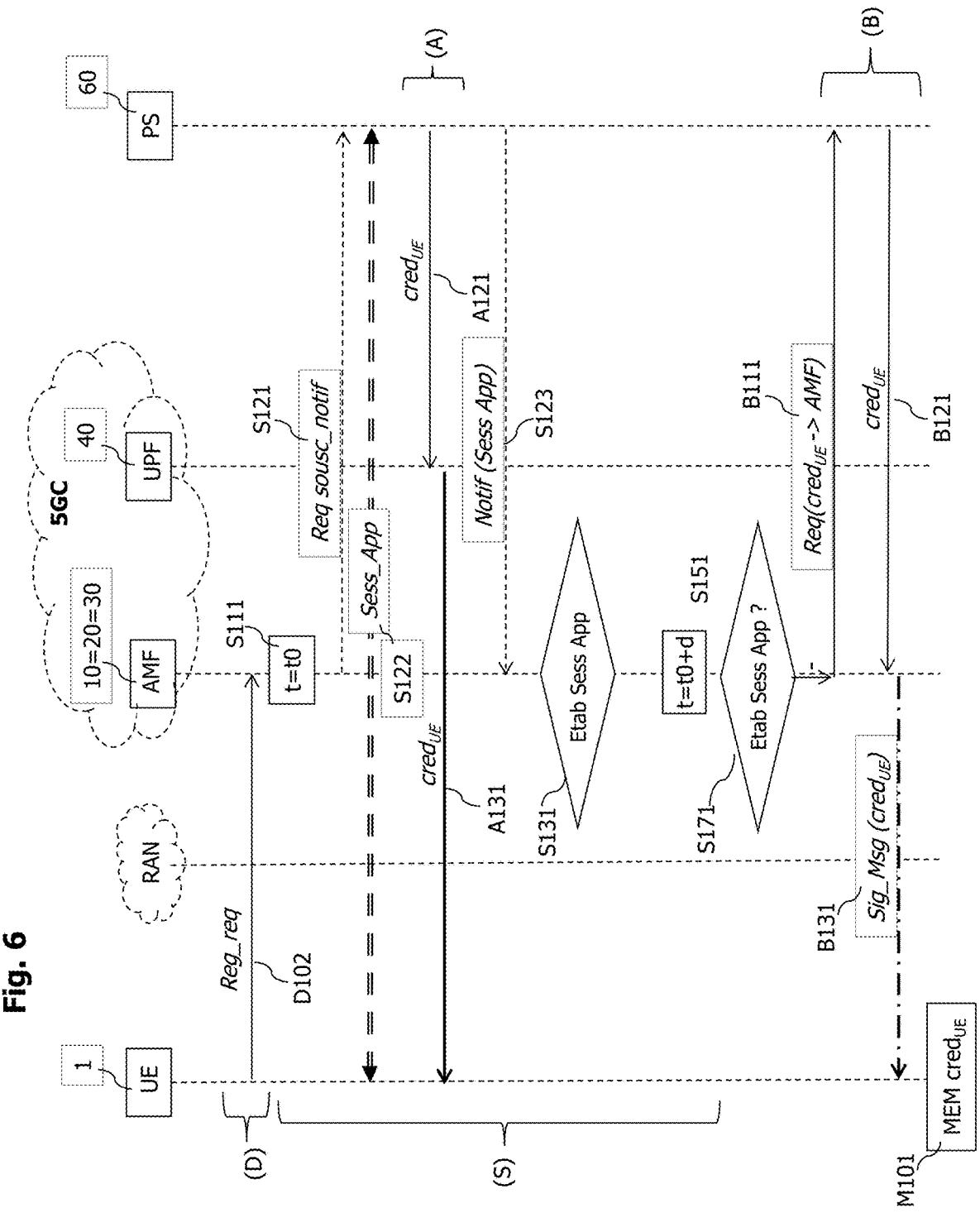
FIG. 6 shows the steps of a method according to a fourth embodiment of the present invention.

Reference is now made to FIG. 6, which illustrates a fourth embodiment of the method according to the present invention.

In this fourth embodiment, the network entities 10-40 and the network equipment 60 are implemented in a similar manner to the third embodiment. This fourth embodiment differs however in that the AMF entity is responsible for indirectly detecting the establishment of an application session between the user equipment UE and the network equipment 60.

The first steps D102 and S111, respectively last steps starting from the step S151, are similar to the first, respectively last, steps of the third embodiment.

However, here, instead of monitoring the establishment of a PDU session, the AMF monitors whether it receives a notification message coming from the server PS (step S123) informing it that the data $d_{UE}$ have already been transmitted by an application session established between the server PS and the user equipment (step S122), in which case it concludes from this that a mode of transmission in the user plane has already been used successfully (step S131). The server PS may spontaneously send out such a notification message once the transmission of the data has succeeded or only do it after the AMF has previously transmitted a subscription request to it for such a notification (step S121), advantageously including the identifier $SUPI_{UE}$ of the user equipment (typically extracted from the request to obtain data) in order for the server PS to only notify the AMF when an application session is established with the equipment UE identified with this identifier.

This fourth embodiment is advantageous in that it minimizes the number of network entities involved in the method, the AMF entity being responsible both for detecting the receipt of a request from the equipment UE and for monitoring and detecting itself the potential establishment of a PDU session with this equipment UE, and for potentially transmitting the authentication data in signaling messages, which allows the exchanges of signaling messages within the network to be minimized, and hence the volume of messages exchanged within the network to be controlled, which may prove to be significant when a very large number of user equipments are trying to obtain authentication data. Furthermore, this allows having to resort to the interception by the AMF of messages between the equipment UE and the SMF for detecting the PDU session, as provided in the third embodiment, to be avoided and hence the functional separation between the AMF and the SMF to be conserved. This fourth embodiment is also advantageous in that it allows, when a PDU session is established but when the supply of authentication data fails (for example an insufficient data rate due to poor radio conditions or a saturation of the network), to switch to a mode of transmission in the control plane, which has more chance of operating under degraded conditions.

Figure 7:
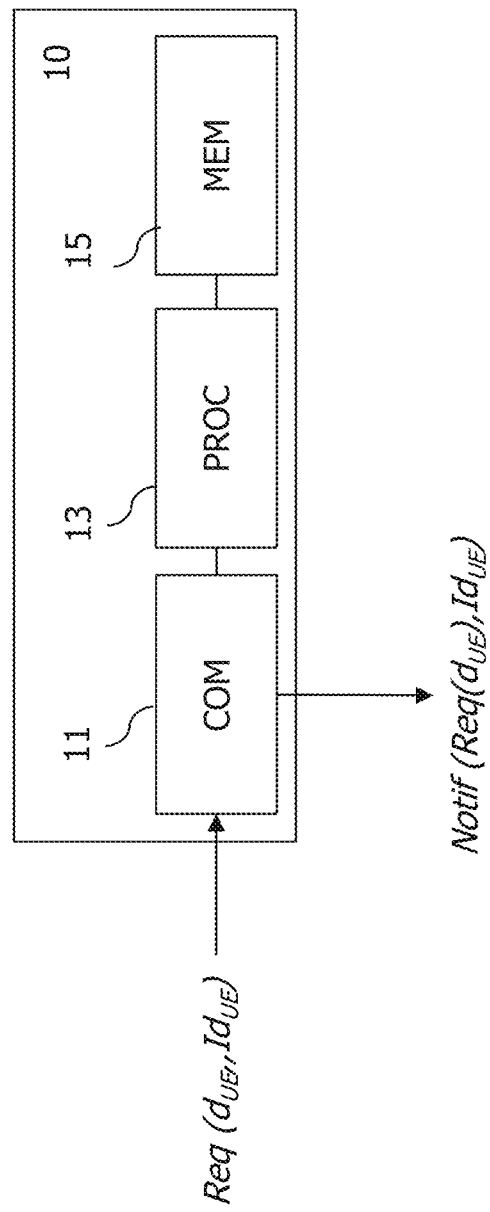
FIG. 7 illustrates a network entity implementing the detection of the receipt of a request according to one embodiment of the invention.

Reference is now made to FIG. 7, which illustrates a network entity 10 responsible for detecting the receipt of a request from a user equipment to obtain data usable by this same user equipment.

This network entity 10, already introduced with reference to FIG. 1, comprises a communication module 11 allowing it to exchange messages with other network entities of a communication network and also with the user equipment, a processing module 13 (comprising one or more processors able to execute computer program instructions) and a storage module 25 (which may comprise a volatile memory and a non-volatile memory for storing computer program instructions).

The processing module 13 is notably configured to, following the receipt by the module 11 of a request made by a user equipment to obtain data usable by this user equipment, trigger a monitoring phase S as previously written:
  either by directly triggering this monitoring phase S when the network entity 10 is also responsible for this monitoring phase;
  or by preparing a notification message informing of the receipt of such a request, potentially inserting into it an identifier of the user equipment extracted from this request, and instructing the module 11 to transmit this notification message to another network entity responsible for this monitoring phase S.

Figure 8:
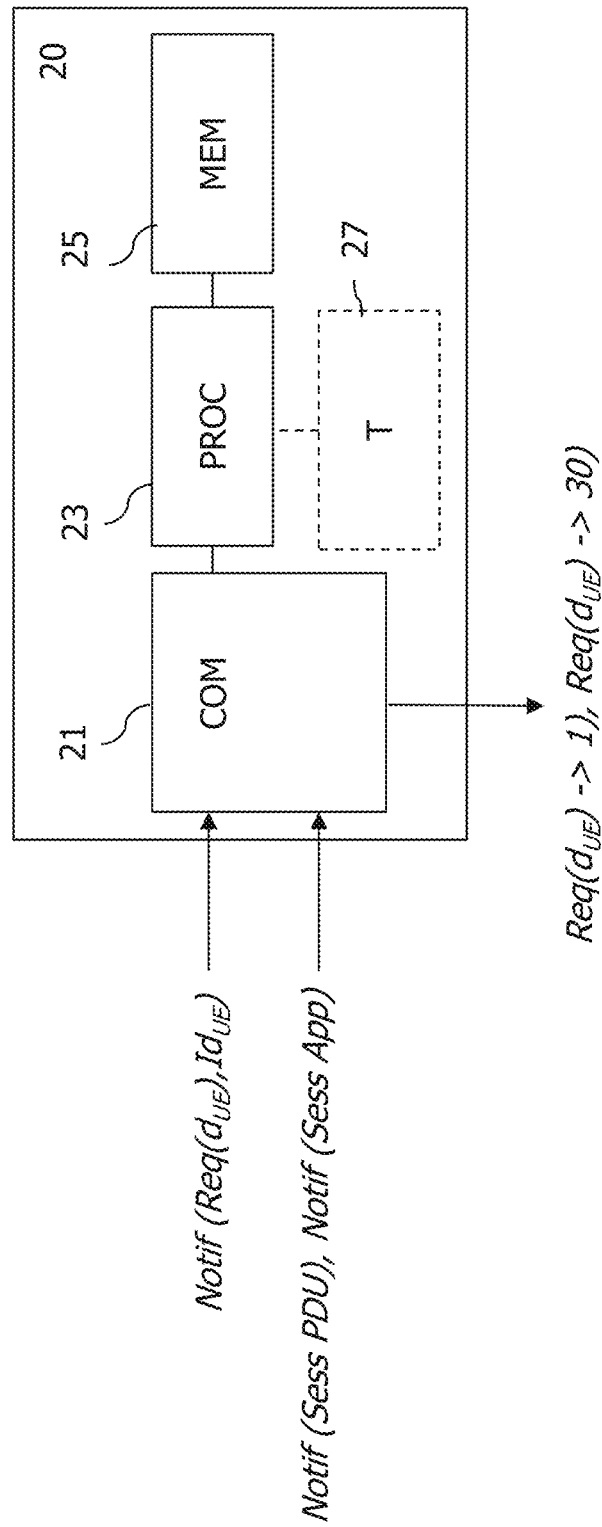
FIG. 8 illustrates a network entity implementing the monitoring of the establishment of a session with the user equipment according to one embodiment of the invention.

Reference is now made to FIG. 8, which illustrates a network entity 20 responsible for monitoring the establishment of a session with a user equipment according to the present invention.

This network entity 20, already introduced with reference to FIG. 1, comprises a communication module 21, allowing it to exchange messages with other network entities of a communication network, a processing module 23 (comprising one or more processors) and a storage module 25 (which may comprise a volatile memory and a non-volatile memory).

The processing module 23 is notably configured to, following the detection of the receipt of a request made by a user equipment to obtain data usable by this user equipment (by the receipt of this request, or of a notification alerting of the receipt of this request, by the communication module 21), trigger a phase S for monitoring the establishment of a session with this user equipment, involving the communication network.

In one particular embodiment, this network entity 20 comprises a timer module 27 configured to trigger a (or even several) timer(s) which, once triggered, expires (expire) after a certain period of time d, able to be predetermined, fixed or else configurable by the operator of the network entity 20. This timer module 27 may be implemented in the form of software or hardware (for example in the form of a separate chronometer).

This timer module 27 may notably trigger several separate timers, at various triggering times t0, where each of these timers may advantageously be associated, when they are triggered, with a user equipment identifier received in a notification of detection of receipt of a request to obtain data sent out by this user equipment. This allows the processing module 23 to easily locate the timer specifically associated with a user equipment with which the establishment of a session is detected, by comparison with the user equipment identifier obtained during the detection of the establishment of the session.

The processing module 23 is thus configured to:
  Either, when it is informed of the establishment of a session before the expiration of the temporary monitoring phase, prepare an instruction message and instructing the module 21 to transmit it to network equipment, for triggering the transmission of the required usable data to the user equipment in the user plane by means of this session.

Or, when it is not informed of the establishment of a session before the expiration of the temporary monitoring phase, send an instruction message to this network equipment for it to supply data to a network entity responsible for inserting them into signaling messages aimed at the user equipment.

The processing module 23 may be configured to extract an identifier of the user equipment (for example in the SUPI or PEI format) in the request, or the notification of the receipt of this request by another network entity, received by the module 21, storing it in the module 25 and inserting it into one of the aforementioned instruction messages.

Figure 9:
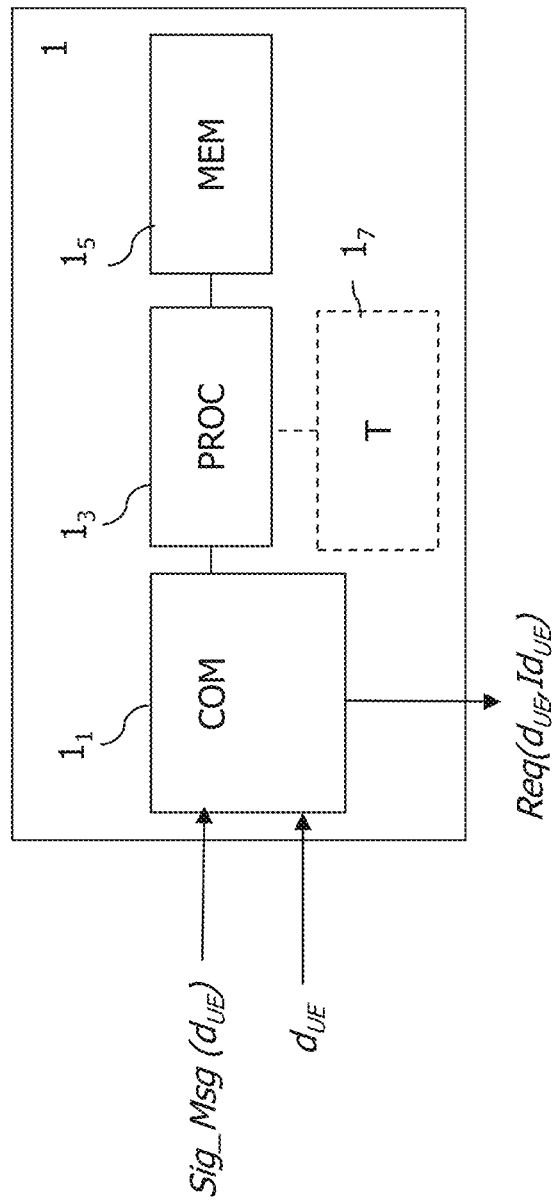
FIG. 9 illustrates a user equipment according to one embodiment of the invention.

Reference is now made to FIG. 9, which illustrates a user equipment 1 according to the present invention.

This user equipment 1, already introduced with reference to FIG. 1, comprises a communication module $1_1$, allowing it to exchange messages with network entities of a communication network (for example messages in radio form when this is a mobile network, in which case the module $1_1$ comprises at least one radio antenna), a processing module $1_3$ (comprising one or more processors) and a storage module $1_5$ (which may comprise a volatile memory and a non-volatile memory).

The processing module $1_3$ is notably configured to, when the user equipment 1 (or a software application installed on this equipment) wishes to obtain data $d_{UE}$ such as previously described, prepare a request for obtaining these data (for example by inserting an indication that these data are required in a request for registration with the network) and instructing the module $1_1$ to transmit this request to a network entity 10 of the network 100 able to receive this request (i.e. the AMF entity for a 5G network).

The communication module $1_1$ is capable of receiving, in response to this request, at least one signaling message containing said required data $d_{UE}$ in this request, coming from a network entity 30 of the network 100. It may alternatively be capable of receiving these data $d_{UE}$ transmitted in the user plane (i.e. by the interface N3 illustrated in FIG. 1 for a 5G network), or even be capable of receiving these data $d_{UE}$ according to either one of these two alternative modes of transmission.

When the communication module $1_1$ is configured to receive the data in the user plane, the processing module $1_3$ may advantageously be configured to insert an identifier of said user equipment (for example its SUPI or PEI identifier) into a connection request intended for the network equipment 60 in which said data $d_{UE}$ are available (e.g. a provisioning server PS, notably for authentication data to be obtained) and transmitting said connection request to this network equipment 60. In the case where the processing module $1_3$ comprises a first signaling processing sub-module, communicating with the AMF entity, and a second application processing sub-module, communicating with the network entity 60, the application processing module requests the identifier of the user equipment from the signaling processing module prior to inserting it into the connection request.

This allows the interruption of the monitoring implemented by the network equipment 60 to be avoided (and hence triggering the supply of the data $d_{UE}$ by means of signaling messages to be avoided) and the acquisition of the data $d_{UE}$ by the network equipment to be triggered, by means of this identifier, which can then transmit them to the user equipment 1, which receives them by means of its communication module 1₁, via a connection established following this request.

In one particular embodiment, the user equipment 1 also comprises a timer module 1₇ which, once triggered, expires after a certain time period d', which may be predetermined, fixed or else configurable by the user of this user equipment or by a software application being run on this equipment. This timer module 1₇ may be a timer or a chronometer implemented in software or hardware form.

Such a timer may be used, by the user equipment 1, for influencing the mode of transmission selected by the network for transmitting the data $d_{UE}$ to it. In particular, when a transmission in the control plane is prioritized by the user equipment, this timer may be triggered by sending the request for obtaining the data $d_{UE}$ and blocking until its expiration the sending of a request for establishing a session to the network 100, whether this be a request for establishing a data session to a network entity of the network 100 (PDU type session for 5G) and/or a request for establishing an application session to the network equipment 50 disposing of these data. By a suitable choice of the value of the timer duration d' (for example taking a value greater than the value of the duration d used by the network entity 20 during its monitoring phase), it is ensured that the data $d_{UE}$ will be received in signaling messages.

It goes without saying that the invention is not limited to the exemplary embodiments described and shown hereinabove, starting from which other embodiments and their implementation could be provided, without however straying from the scope of the invention.

Thus, examples of application of the invention in the specific case of a mobile network of fifth generation have been illustrated, but the invention may also be applied to a mobile network of fourth generation (in which case the network entities 10, 20, 30 could be implemented by a mobility management entity or one of the mobile networks of later generation. In addition, as already indicated, the various network entities mentioned illustrated by FIG. 1 may be distinct from one another, but it is also possible for some of them to be combined within the same network entity, depending on the architecture of the network in which the invention is applied.

Although the present disclosure has been described with reference to one or more examples, workers skilled in the art will recognize that changes may be made in form and detail without departing from the scope of the disclosure and/or the appended claims.

The invention claimed is:

1. A method for transmission of data from a communication network to a user equipment, comprising:
   detecting receipt of a request to obtain data, sent out by said user equipment;
   monitoring whether a session with said user equipment over the communication network is established following the detection of the receipt of said request; and
   in response to no establishment of a session with said user equipment being detected before expiration of a time period after the detection of the receipt of said request, transmitting to the user equipment at least one signaling message containing said data.

2. The method as claimed in claim 1, furthermore comprising, when the establishment of a session with the user equipment is detected before the expiration of said time period, transmitting to the user equipment, by using said session, said data.

3. The method as claimed in claim 1, wherein said data are data usable by the user equipment, available in network equipment implementing said monitoring of the establishment of a session with the user equipment, distinct from a first network entity receiving said request sent out by the user equipment, the detection of the receipt of said request furthermore comprising transmitting, from the first network entity to the network equipment, a message notifying receipt of said request by the first network entity, said monitoring being triggered by the receipt of the notification message by the network equipment.

4. The method as claimed in claim 3, wherein said session is an application session established between the network equipment and the user equipment.

5. The method as claimed in claim 3, wherein said session is a data exchange session established by using a session management entity, said monitoring of the establishment of a session comprising the monitoring, by the network equipment, of the receipt of a message notifying the establishment of a session for exchange of data whose transmission is triggered by said session management entity following establishment of a data exchange session by using the session management entity.

6. The method as claimed in either of claim 1, wherein said data are available via network equipment distinct from a second network entity implementing said monitoring of the establishment of a session with the user equipment, said transmission to the user equipment of the at least one signaling message containing said data comprising:
   transmitting, from the second network entity to the network equipment, a request instructing the network equipment to transmit said data to a third network entity; and
   transmitting, from said third network entity to the user equipment, at least one signaling message containing said data.

7. The method as claimed in claim 6, wherein the second network entity receives said request, the receipt of said request triggering the monitoring of the establishment of a session with the user equipment.

8. The method as claimed in claim 6, wherein said session is a session established by using a session management entity, said monitoring of the establishment of a session comprising monitoring, by the second network entity, receipt of a notification message whose transmission is triggered by said session management entity following the establishment of a session established by using the session management entity.

9. The method as claimed in claim 6, wherein said session is a data exchange session established by using a session management entity, said monitoring of the establishment of a session comprising monitoring, by the second network entity, transmission between the session management entity and the user equipment of a message confirming establishment of a data exchange session with the user equipment.

10. The method as claimed in claim 6, wherein said session is an application session established between the network equipment and the user equipment, the network equipment transmitting to the second network entity a message notifying establishment of a data exchange session following the establishment of said application session.

11. A network entity able to be used in a communication network, said network entity comprising:
- at least one processor; and
- at least one computer readable storage medium comprising instructions stored thereon which when executed by the at least one processor configure the network entity to:
- monitor whether a session with a user equipment is established over the communication network following detection of receipt of a request to obtain data, sent out by said user equipment; and
- in response to no establishment of a session with said user equipment being detected before expiration of a time period after said detection of the receipt of said request, trigger transmission to the user equipment of at least one signaling message containing said data.

12. A user equipment able to be used with a communication network, said user equipment comprising:
- at least one processor; and
- at least one computer readable storage medium comprising instructions stored thereon which when executed by the at least one processor configure the user equipment to:
- transmit, to a network entity of the communication network, a request to obtain data; and
- receive in return, from a network entity of the communication network, at least one signaling message containing said data, transmitted following expiration of a time period after receipt of said request without a session having been established with said user equipment over the network.

13. The user equipment as claimed in claim 12, furthermore comprising a timer module, configured so as to be triggered by the transmission of the request to obtain data and blocking transmission of a request for establishment of a session to the network until expiration of a given time period after the triggering of the timer module.

14. The user equipment as claimed in claim 12, wherein the instructions furthermore configure the user equipment to insert an identifier of said user equipment into a connection request to network equipment from which said data are available and transmit said connection request to said network equipment, in order to trigger acquisition of said data by the network equipment by using said identifier and receipt of said data via a connection with the network equipment.

* * * * *